US008554278B2

(12) United States Patent
Sammarco

(10) Patent No.: US 8,554,278 B2
(45) Date of Patent: Oct. 8, 2013

(54) MOBILE DEVICE DISPLAY OF MULTIPLE STREAMED DATA SOURCES

(75) Inventor: Anthony J. Sammarco, Garner, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1285 days.

(21) Appl. No.: 11/380,451

(22) Filed: Apr. 27, 2006

(65) Prior Publication Data

US 2007/0143791 A1 Jun. 21, 2007

Related U.S. Application Data

(63) Continuation-in-part of application No. 11/306,217, filed on Dec. 20, 2005.

(51) Int. Cl.
*H04B 1/38* (2006.01)
(52) U.S. Cl.
USPC ........... 455/566; 715/838; 715/835; 715/836; 715/837; 725/109; 725/113
(58) Field of Classification Search
USPC ........... 455/3.01, 3.02, 3.04, 566; 348/14.01, 348/14.02, 14.03, 333.05, 333.01, 333.02, 348/333.11, 731; 715/838, 835–837, 839, 715/716, 719, 730, 720, 721, 723; 725/109, 725/113; 345/660
See application file for complete search history.

(56) References Cited

U.S. PATENT DOCUMENTS

| | | | | |
|---|---|---|---|---|
| 5,884,056 A | * | 3/1999 | Steele | ........................... 715/738 |
| 2001/0051516 A1 | * | 12/2001 | Nakamura et al. | ............ 455/412 |

| | | | | |
|---|---|---|---|---|
| 2003/0014752 A1 | * | 1/2003 | Zaslavsky et al. | ............... 725/40 |
| 2003/0035054 A1 | * | 2/2003 | Ohmura | ...................... 348/231.2 |
| 2003/0112357 A1 | * | 6/2003 | Anderson | ................ 348/333.05 |

(Continued)

FOREIGN PATENT DOCUMENTS

| | | |
|---|---|---|
| CN | 1652677 A | 8/2005 |
| EP | 1538829 | 6/2005 |

(Continued)

OTHER PUBLICATIONS

Sony Ericsson Mobile Communications AB, International Application Ser. No. PCT/US06/031869, International Search Report, Apr. 27, 2007.
Sony Ericsson Mobile Communications AB, International Application Ser. No. PCT/US06/031869, Written Opinion, Apr. 27, 2007.

(Continued)

*Primary Examiner* — Kamran Afshar
*Assistant Examiner* — Sayed T Zewari
(74) *Attorney, Agent, or Firm* — Sreenivas Vedantam; Moore & Van Allen PLLC

(57) ABSTRACT

A system and method of navigating among multiple real-time data streams on a mobile device is presented. Multiple thumbnail image representations are displayed wherein each thumbnail image is associated with an available real-time data stream. A user provides navigation input via a user interface for navigating among the multiple displayed thumbnail image representations. The thumbnail image representation currently selected based on the navigation input is highlighted or otherwise made to stand out on the mobile device display. The user then selects a highlighted thumbnail image representation, via the user interface, thereby activating the real-time data stream associated with the highlighted thumbnail image representation. This causes the real-time data stream associated with the selected highlighted thumbnail image representation to be displayed on the mobile device display.

6 Claims, 6 Drawing Sheets

(56) References Cited

U.S. PATENT DOCUMENTS

| | | | |
|---|---|---|---|
| 2003/0133032 A1* | 7/2003 | Aoki et al. | 348/333.05 |
| 2005/0048916 A1* | 3/2005 | Suh | 455/39 |
| 2005/0071782 A1* | 3/2005 | Barrett et al. | 715/838 |
| 2005/0160465 A1* | 7/2005 | Walker | 725/86 |
| 2005/0162718 A1* | 7/2005 | Kim et al. | 358/537 |
| 2005/0176471 A1* | 8/2005 | Masuda et al. | 455/566 |
| 2006/0019728 A1* | 1/2006 | Sakamoto et al. | 455/575.3 |
| 2006/0045465 A1* | 3/2006 | Ono et al. | 386/46 |
| 2006/0103753 A1* | 5/2006 | Lee | 348/333.11 |
| 2006/0200842 A1* | 9/2006 | Chapman et al. | 725/34 |
| 2007/0137988 A1* | 6/2007 | Yu et al. | 200/4 |

FOREIGN PATENT DOCUMENTS

| | | |
|---|---|---|
| JP | H10-229529 A | 8/1998 |
| JP | 2004-007228 A | 1/2004 |
| JP | 2004145523 A | 5/2004 |
| JP | 2004186830 A | 7/2004 |
| WO | 2005/091295 | 9/2005 |

OTHER PUBLICATIONS

International Preliminary Report on Patentability, corresponding to International Patent Application No. PCT/US2006/031869, dated Jul. 3, 2008.

State Intellectual Property Office, P.R. China, First Office Action, Oct. 16, 2009.

Canadian Intellectual Property Office, Canada, Office Action, Dec. 1, 2009.

European Patent Office, Office Action, Mar. 24, 2010, 2 pgs.

Japanese Patent Office; Final Rejection; Sep. 2, 2011; issued in Japanese Patent Application No. 2008-547213.

Malaysian Intellectual Property Office; Substantive Examination Adverse Report; Apr. 15, 2011; issued in Malaysian Patent Application No. PI 20082228.

Japanese Patent Office; First Office Action; Feb. 14, 2011; issued in Japanese Patent Application No. 2008-547213.

State Intellectual Property Office, P.R. China; Second Office Action; Nov. 16, 2011; issued in Chinese Patent Application No. 200680048322.7.

* cited by examiner

MOBILE DEVICE DISPLAY OF MULTIPLE STREAMED DATA SOURCES

RELATED APPLICATIONS

This application in a continuation-in-part of U.S. patent application Ser. No. 11/306,217 filed Dec. 20, 2005, the entirety of which is incorporated herein by reference.

BACKGROUND OF THE INVENTION

The present invention relates to portable mobile communications devices and systems, and more particularly to a portable mobile communications device, system and method that can display and manipulate multiple real-time data streams on a mobile device.

Portable mobile communications devices such as mobile phones are becoming more sophisticated and include many new features and capabilities. One such feature is the capability to receive mobile broadcast signals, mobile television, or the like. Such services include digital video broadcast-handheld (DVB-H), digital media broadcast (DMB), integrated services digital broadcast-terrestrial (ISDB-T), mobile broadcast multi-cast service (MBMS), or similar technologies. When integrated into a mobile phone, all of the aforementioned technologies utilize a separate mobile broadcast tuner except for MBMS which can be received using the portable mobile communications device existing mobile radio receiver and transmitter.

Navigating the content of the data streams provided by these technologies is not always visually intuitive. For instance, a user may not be able to see a clip or sample of available data streams prior to making a selection to 'attach' to and receive a particular data stream.

Currently, there are no provisions addressing the user's dilemma described above. What is needed is a mechanism that allows the user to simultaneously view multiple instances of real-time data streams on his mobile device prior to making a selection to receive one as a primary viewing option.

BRIEF SUMMARY OF THE INVENTION

A system and method of navigating among multiple real-time data streams on a mobile device is presented. Multiple thumbnail image representations are displayed wherein each thumbnail image is associated with an available real-time data stream. A user provides navigation input via a user interface for navigating among the multiple displayed thumbnail image representations. The thumbnail image representation currently selected based on the navigation input is highlighted or otherwise made to stand out on the mobile device display. The user then selects a highlighted thumbnail image representation, via the user interface, thereby activating the real-time data stream associated with the highlighted thumbnail image representation. This causes the real-time data stream associated with the selected highlighted thumbnail image representation to be displayed on the mobile device display. The audio portion of the real-time data stream associated with the highlighted thumbnail image representation can be activated if the mobile device is capable.

The thumbnail image representations can be still images captured from their associated real-time data streams or reduced versions of the real-time data streams themselves provided the mobile device is capable of displaying multiple real-time data streams simultaneously.

DETAILED DESCRIPTION OF THE INVENTION

Some mobile devices can receive mobile broadcast television signals or mobile television or the like, such as digital video broadcast-handheld (DVB-H), digital media broadcast (DMB), integrated services digital broadcast-terrestrial (ISDB-T) or similar technologies. These technologies provide for real-time streams of audio/visual data to a mobile device. The term real-time data stream used throughout this disclosure applies to the aforesaid specifically as well as any data signal having an audio and video component capable of being streamed (wired or wirelessly) from a source to a mobile device regardless of the format of the data.

Figure 1:
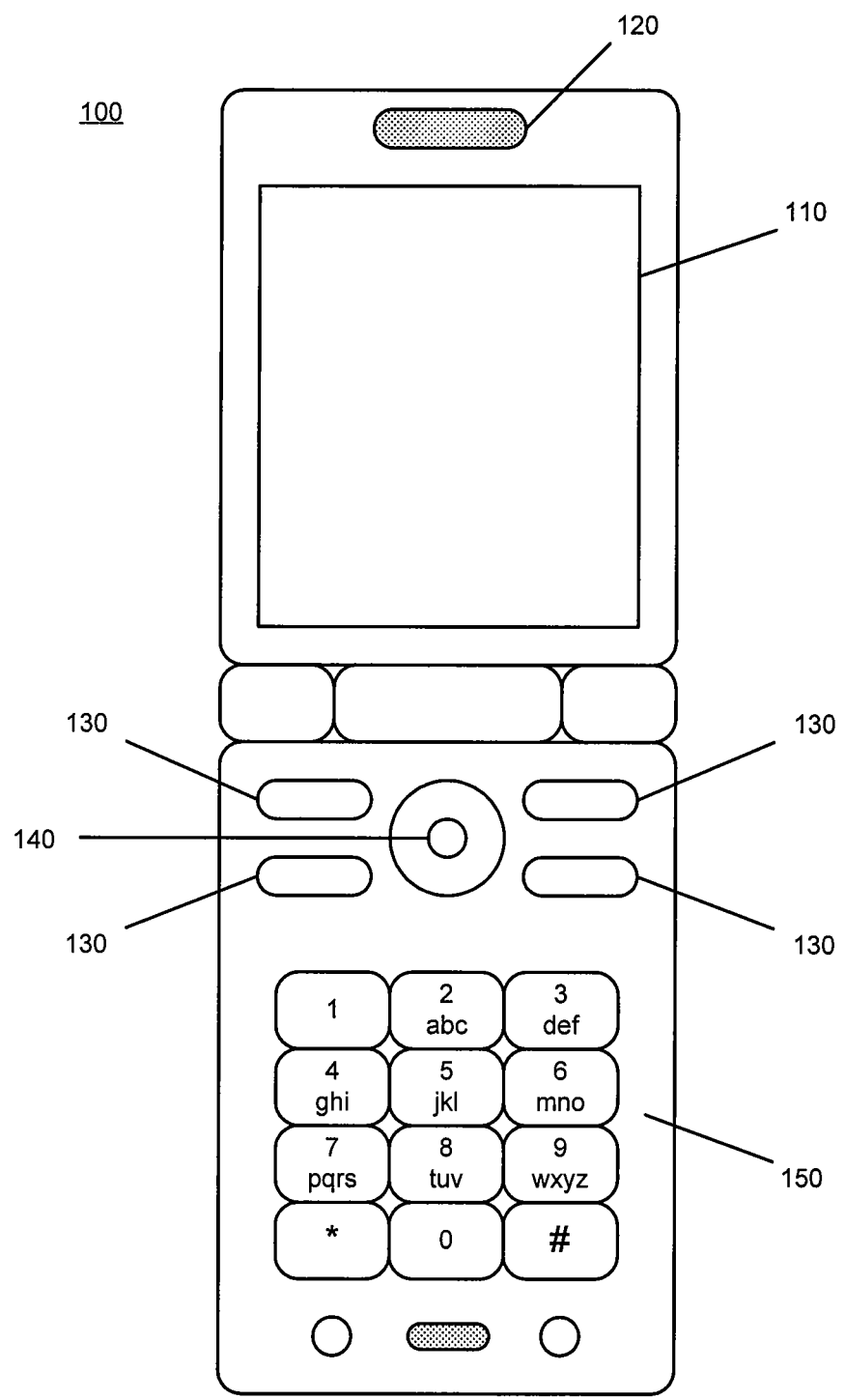
FIG. 1 is an exterior block diagram of an exemplary portable mobile communications device capable of receiving and displaying real-time audio/visual data streams.

FIG. 1 is a block diagram of an exemplary portable mobile communications device capable of receiving and displaying real-time audio/visual data streams. Portable mobile communications device 100 is illustrated in this example as a common "flip" or "clamshell" type mobile phone having a display 110 and speaker 120 in the upper portion of the portable mobile communications device 100 and multiple function keys 130, a joystick, and an alpha-numeric keypad 150 in the lower portion of the portable mobile communications device 100.

The device illustrated in FIG. 1 is assumed to be equipped with the means necessary to receive and display audio/visual data streams such as, for instance, mobile television broadcasts. The present invention addresses presentation and navigation tools that provide the user with a convenient means for browsing among and selecting one or more data streams to view on his mobile device. Thus, the electronics, hardware, and software that make up the "mobile television" receiver within the mobile device are illustrated but not necessarily described herein. What is described is the hardware and software used to manipulate and present the data streams capable of being received by the mobile device.

Figure 2:
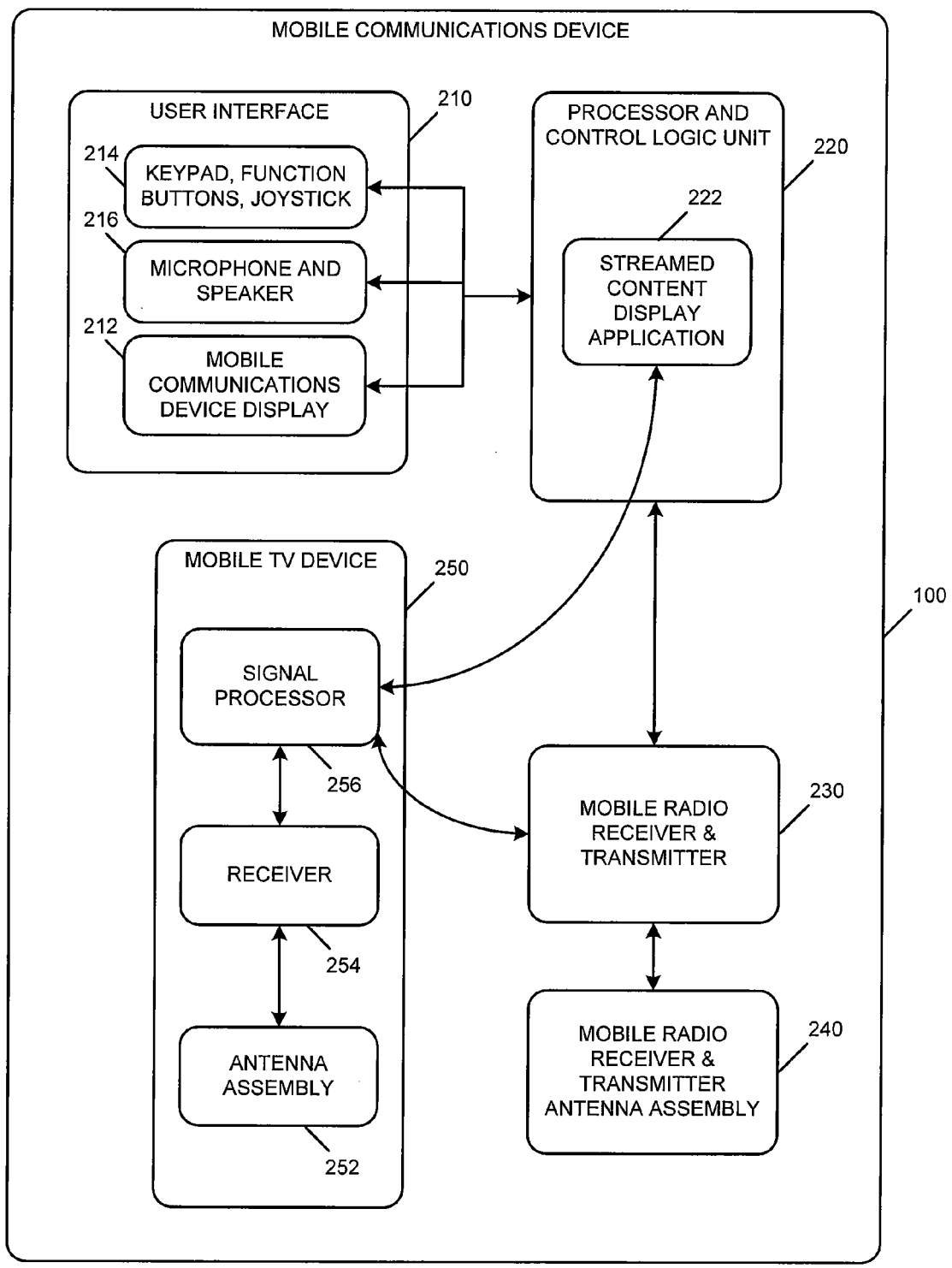
FIG. 2 is a block diagram of selected internal components of the portable mobile communications device capable of receiving and displaying real-time audio/visual data streams.

FIG. 2 is a block diagram of selected internal components of the portable mobile communications device capable of receiving and displaying real-time audio/visual data streams. FIG. 2 is for purposes of explaining the present invention and the present invention is not limited to any particular design.

The portable mobile communications device 100 shown in FIG. 2 may include an operator or user interface 210 to facilitate controlling operation of the portable mobile communications device 100 including initiating and conducting phone calls and other communications. The user interface 210 may include a display 212 to provide visual signals to a subscriber or user as to the status and operation of the portable mobile communications device 100. The display 212 may be a liquid crystal display (LCD) or the like capable of presenting color images. The display 212 may provide information to a user or operator in the form of images, text, numerals, characters, a graphical user interface (GUI) and the like.

The user interface 212 may also include a keypad and function keys or buttons 214 including a pointing device, such as a joystick or the like. The keypad, function buttons and joystick 214 permit the user to communicate commands to the portable mobile communications device 100 to dial phone numbers, initiate and terminate calls, establish other communications, such as access to a mobile TV provider, the Internet, send and receive email, text messages and the like. The keypad, function buttons and joystick 214 may also be used to control other operations of the portable mobile communications device 100. The keypad, function buttons and joystick 214 may also be implemented on a touch sensitive display adapted to receive tactile input.

The display 212, keypad, and function buttons 214 may be coupled to a main processor and control logic unit 220. The processor and control logic unit 220 may be a microprocessor or the like. The processor and logic unit 220 may include an application 222 to facilitate navigation and display of streamed content. The functions and operations described with respect to a portable mobile communications device 100 in the method of FIG. 6 may be embodied in the application 222 for navigating and displaying streamed content. The navigating and displaying streamed content application 222 may be embodied in hardware, firmware, software (data structures) or combinations thereof. The processor and logic unit 220 may also include other data structures, software programs, computer applications and the like to encode and decode control signals, perform communication procedures, and other functions as described herein.

The user interface 210 may also include a microphone and a speaker 216. The microphone 216 may receive audio or acoustic signals from a user or from another acoustic source. The microphone 216 may convert the audio or acoustic signals to electrical signals. The microphone 216 may be connected to the processor and logic unit 220 wherein the processor and logic unit 220 may convert the electrical signals to baseband communication signals. The processor and control logic unit 220 may be connected to a radio transmitter 230 that may convert baseband signals from the processor and control logic unit 220 to radio frequency (RF) signals. The radio transmitter 230 may be connected to an antenna assembly 240 for transmission of the RF signals to a communication medium or system, such as a mobile radio access network (MRAN) or the like.

The portable mobile communications device 100 may also include a mobile TV device 250. The mobile TV device 250 may be a DVB-H type device or the like. The mobile TV device 250 may be integrally formed as part of the portable mobile communications device 100 or may be a separate unit that may be connected and operate in association with the portable mobile communications device 100. The mobile TV device 250 may include an antenna assembly 252 for receiving broadcast signals of programming from a mobile TV broadcast network, broadcast radio access network (B-RAN), or the like. A receiver 254 may be coupled to the antenna assembly 252 to receive the broadcast signals. A signal processor 256 may receive the broadcast signals from the receiver 254 and convert the signals (i.e., streamed content) to a format for presentation on the display 212 of the portable mobile communications device 100.

Figure 3:
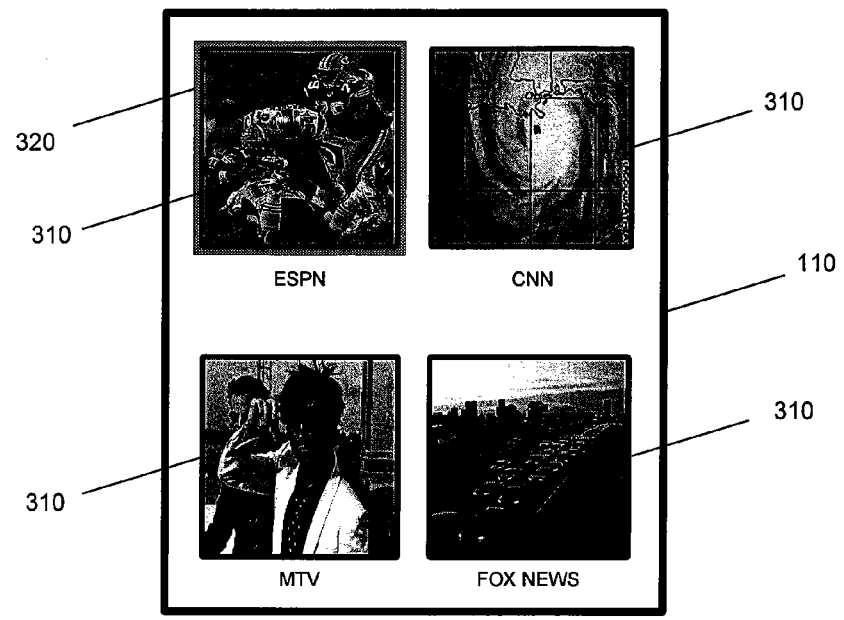
FIG. 3 is a diagram of a display on a portable mobile communications device, the display illustrating thumbnail representations of multiple real-time audio/visual data streams.

FIG. 3 is a diagram of a display 110 on a portable mobile communications device, the display illustrating thumbnail image representations 310 of multiple real-time audio/visual data streams. The user can navigate among the thumbnail images 310 to gain a preview of what is available for real-time streaming. Each time the user navigates to a thumbnail, the border area is highlighted 320 or otherwise made more noticeable to the user to indicate which thumbnail image is currently selected.

FIG. 3 displays still images obtained from each available real-time stream. The stills are obtained from the respective real-time streams as contemporaneously as possible to provide as current a picture with respect to the actual program being broadcast. If the mobile device is capable of handling and outputting multiple real-time data streams simultaneously, then the thumbnail images can be replaced with thumbnail data streams.

Since only one audio feed can be accommodated at a given time, the thumbnail that is currently highlighted would have its audio portion of the real-time data stream "active". This would provide a preview screen with multiple real-time streams displayed for selection.

Figure 4:
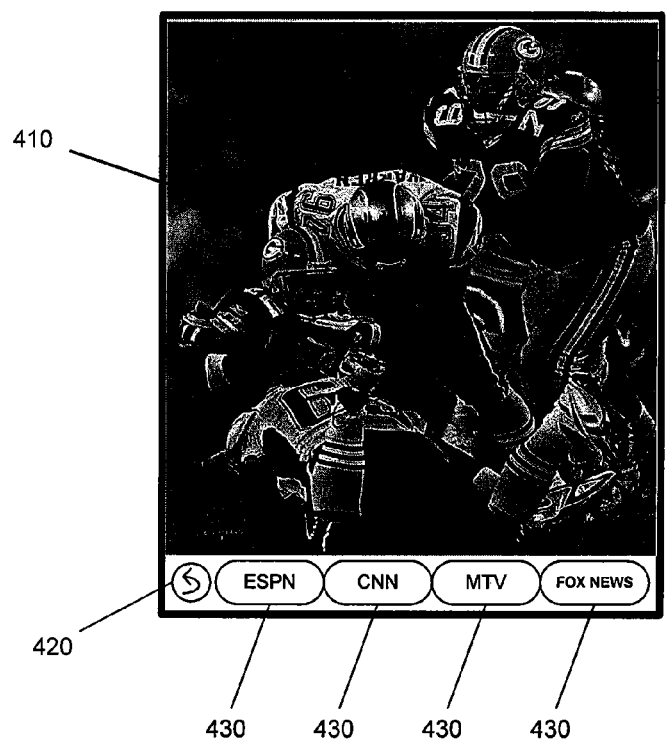
FIG. 4 is a diagram of a display on a portable mobile communications device, the display illustrating a full screen representation of a selected real-time audio/visual data stream.

FIG. 4 is a diagram of a display on a portable mobile communications device, the display illustrating a full screen representation of a selected real-time audio/visual data stream. Once the user has made a selection from the display shown in FIG. 3, the real-time data stream 410 associated with that thumbnail selection is activated. Small icons at the bottom of the display allow the user to jump back 420 to the thumbnail display of FIG. 3, or directly switch to one of the other available real-time data streams 430.

Figure 5:
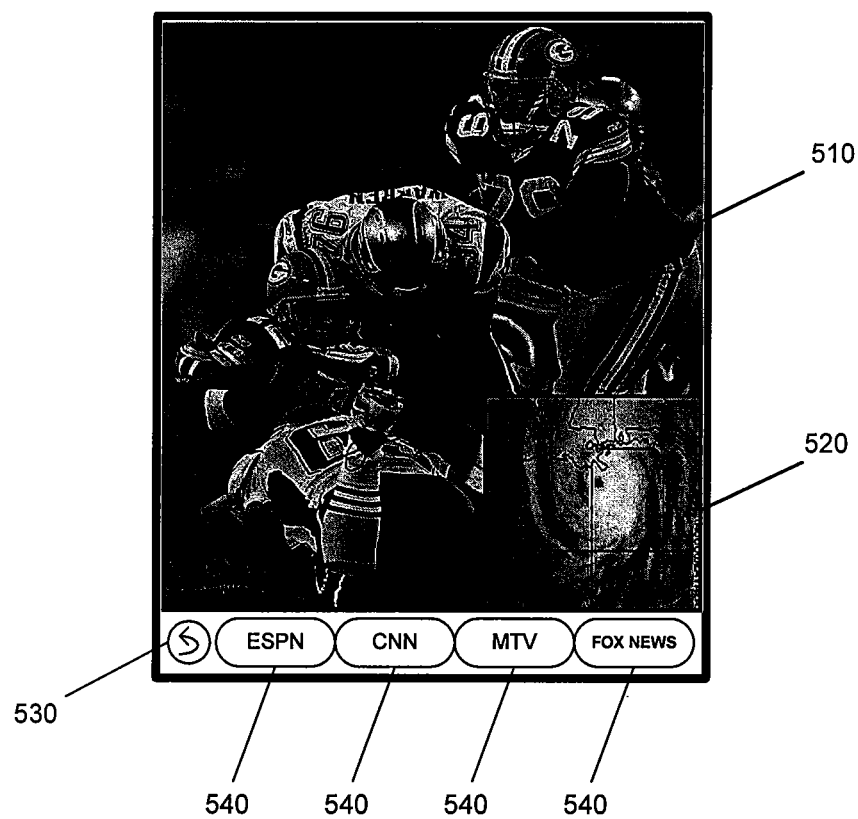
FIG. 5 is a diagram of a display on a portable mobile communications device, the display illustrating a picture-in-picture representation of multiple real-time audio/visual data streams.

FIG. 5 is a diagram of a display on a portable mobile communications device, the display illustrating a picture-in-picture representation of multiple real-time audio/visual data streams. In this example, the user can set up a picture-in-picture view of two real-time data streams. The larger real-time data stream 510 is designated as the primary feed while the smaller real-time data stream is designated as the secondary feed. Icon 530 allows the user to switch the primary and secondary designations while icons 540 allow the user to move a new real-time data stream into the secondary position.

Figure 6:
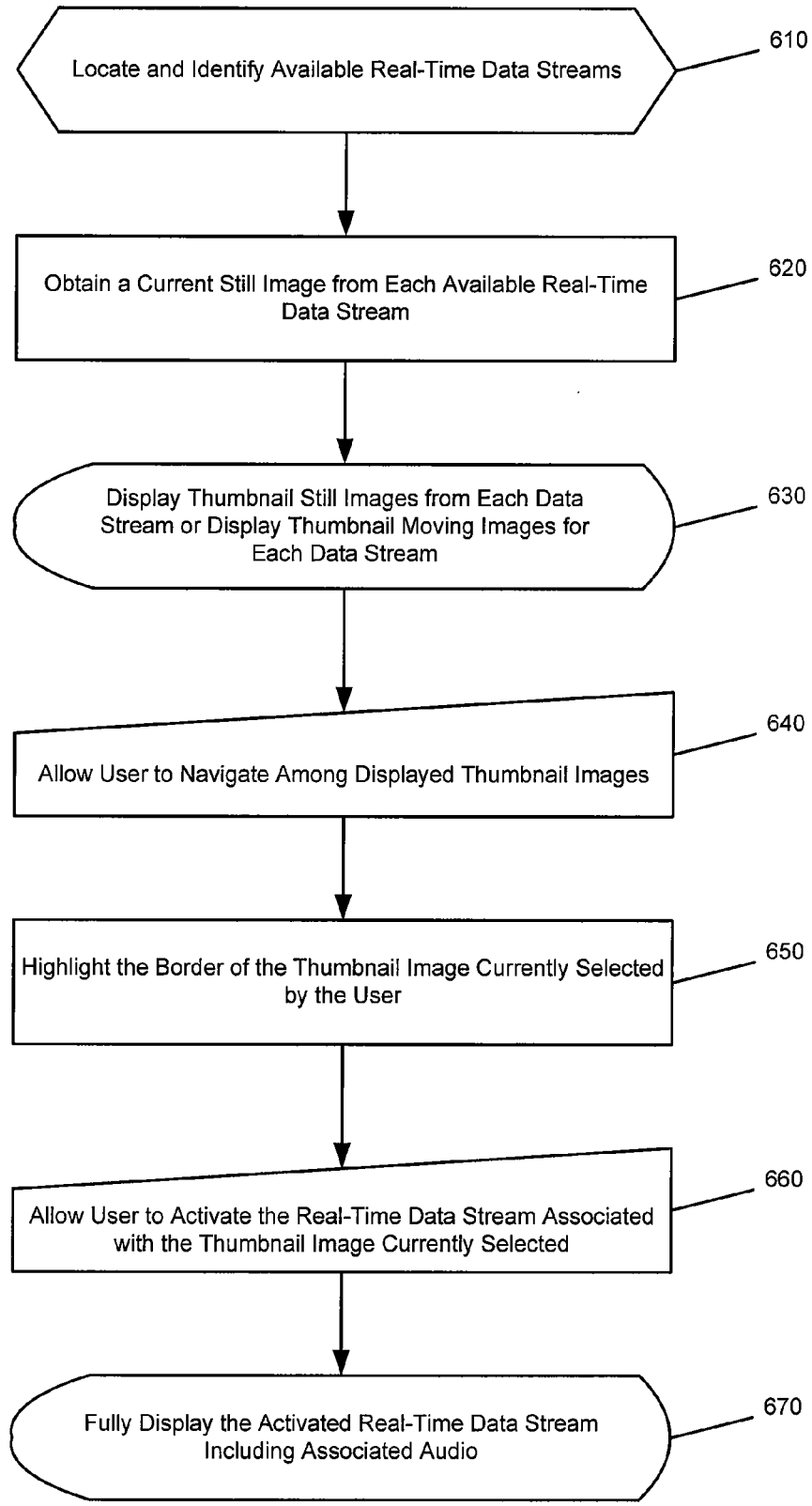
FIG. 6 is a flowchart describing a method of operation according to an embodiment of the present invention.

FIG. 6 is a flowchart describing a method of operation according to an embodiment of the present invention. In preparation block 610, all available real-time data streams capable of being displayed by the mobile device are located and identified. In block 620, a current still image is obtained from each available real-time data stream. In block 630, the mobile device displays thumbnail images representing each real-time data stream. If the mobile device is capable of executing multiple real-time data streams simultaneously, then each real-time data stream is shown as a thumbnail rather than a still image captured from the data stream. In block 640, the mobile device responds to user input to navigate among the thumbnail images. In block 650, the mobile device will highlight the border area of the thumbnail image currently selected by the user. In addition, the mobile device can play the real-time audio portion data stream associated with the highlighted thumbnail if capable to provide the user with a greater sense of the current programming. When the user navigates to another thumbnail, the current audio output will switch to the audio associated with the newly selected thumbnail image. In block 660, the user selects one of the thumbnail images. This activates the real-time data stream associated with the selected thumbnail image. In block 670, the now active real-time data stream is displayed fully on the mobile device including audio.

Figure 7:
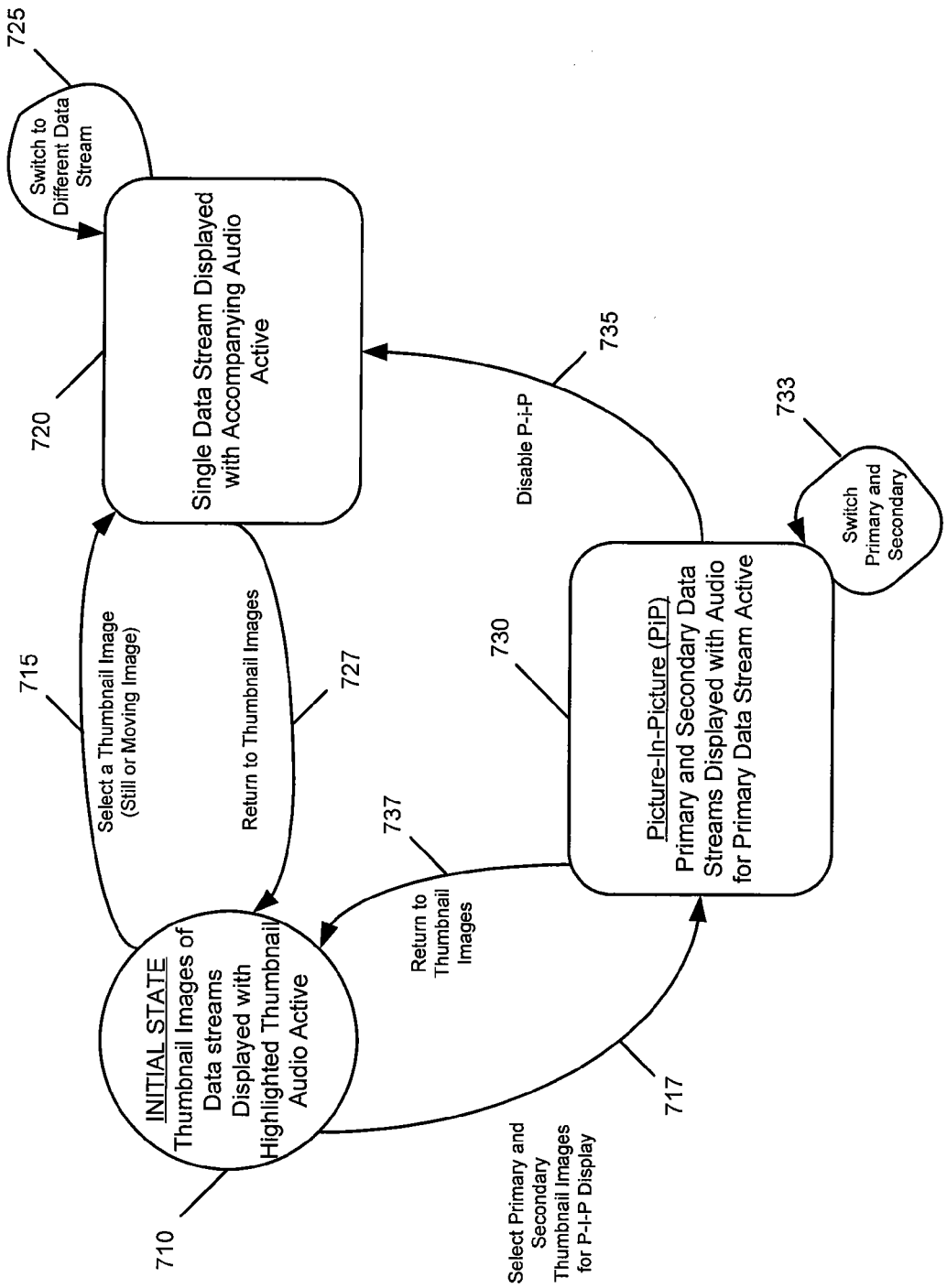
FIG. 7 is a state diagram describing various states and state transitions for the display of a portable mobile communications device when viewing real-time data streams according to an embodiment of the present invention.

FIG. 7 is a state diagram describing various states and state transitions for the display of a portable mobile communications device when viewing real-time data streams according to an embodiment of the present invention. In the initial state 710, thumbnail images or thumbnail data streams are presented on the display of a mobile device. Based on the user's navigation one of the thumbnails will be highlighted or otherwise stand out on the display. If the mobile is capable, the highlighted thumbnail will have its audio active. There are two transitions shown from the initial state to an alternate state.

In one transition from the initial state 710, the user selects the highlighted thumbnail image 715 or data stream causing the real-time data stream associated with the selected thumbnail to become active. This is illustrated in state box 720 in which a single real-time data stream is displayed with its audio. While in this state, the user can cause two transitions. The first is simply to select a new feed 725 which will cause the mobile device to switch to a different real-time data stream. The second transition is to return 727 to the initial state 710 of multiple thumbnail images.

In the second transition from the initial state 710, the user selects a primary and secondary thumbnail for a picture-in-picture type display 717. The picture-in-picture state 730 displays the primary real-time data stream in most of the mobile device display and the secondary real-time data stream in a smaller portion of the mobile device display. In addition, the audio for the primary real-time data stream is active. From the picture-in-picture state 730 there are three transition options shown. The first transition is simply to switch or swap the primary and secondary designations 733 for the real-time data streams. This makes the secondary into the primary and vice-versa. The audio for the new primary real-time data stream is now activated while the other audio is deactivated. The second transition is to disable picture-in-picture 735 in favor of the single display state 720. This transition causes the secondary real-time data stream to disappear from the mobile device display. The last state transition is to return 737 to the initial state 710 of multiple thumbnail images.

Any prompts associated with the invention may be presented and responded to via an interactive voice feature, a graphical user interface (GUI) presented on the display of the portable mobile communications device or the like.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, or semiconductor system, apparatus, or device medium. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention may have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of navigating among multiple real-time data streams on a mobile device, the method comprising:
   locating and identifying real-time data streams capable of being displayed by the mobile device;
   determining whether the mobile device is capable of executing multiple real-time data streams simultaneously;
   displaying multiple thumbnail image representations, each thumbnail image representation associated with an available real-time data stream, wherein the multiple thumbnail image representations are generated on the mobile device;
   receiving a selection for a picture-in-picture (PIP) display;
   receiving a first navigation input from a user interface, the navigation input for navigating among the multiple displayed thumbnail image representations;
   selecting a primary thumbnail image representation based on the navigation input;
   receiving a second navigation input from the user interface and selecting a secondary thumbnail image representation based on the second navigation input;
   activating an audio portion of the real-time data stream associated with the primary thumbnail image representation; and
   displaying the real-time data stream associated with the primary thumbnail image representation and the real-time data stream associated with the second thumbnail image representation in a PIP format on a mobile device display,
   wherein the thumbnail image representations comprise still images captured from their associated real-time data streams when the mobile device is not capable of executing multiple real-time data streams simultaneously and wherein each thumbnail image representation comprises a real-time data stream when the mobile device is capable of executing multiple real-time data streams simultaneously.

2. The method of claim 1 further comprising switching to the secondary thumbnail image representation and activating an audio portion of the real-time data stream associated with the secondary thumbnail image representation.

3. A mobile device for navigating among multiple real-time data streams comprising:
   a data stream receiver for locating and identifying real-time data streams capable of being displayed by the mobile device and receiving multiple real-time data streams;
   a display for displaying multiple thumbnail image representations, each thumbnail image representation associated with an available real-time data stream, wherein the multiple thumbnail image representations are generated on the mobile device;
   a user interface for receiving navigation input and receiving a selection for a picture-in-picture (PIP) display, the navigation input for navigating among the multiple displayed thumbnail image representations, selecting a primary thumbnail image representation based on the navigation input, and selecting a secondary thumbnail image representation based on the navigation input; and
   a processor coupled with the data stream receiver, the display, and the user interface, the processor configured to determine whether the mobile device is capable of executing multiple real-time data streams simultaneously and to activate an audio portion of the real-time data stream associated with the primary thumbnail image representation,
   wherein the real-time data stream associated with the primary thumbnail image representation and the real-time data stream associated with the second thumbnail image representation are displayable in a PIP format on the mobile device display,
   wherein the thumbnail image representations comprise still images captured from their associated real-time data streams when the mobile device is not capable of executing multiple real-time data streams simultaneously and wherein each thumbnail image representation comprises a real-time data stream when the mobile device is capable of executing multiple real-time data streams simultaneously.

4. The mobile device of claim 3 wherein an audio portion of the real-time data stream associated with the highlighted thumbnail image representation is activated.

5. A non-transitory computer readable storage medium, the computer readable storage medium containing a computer program product for navigating among multiple real-time data streams on a mobile device, the computer readable storage medium comprising:
   computer program code for locating and identifying real-time data streams capable of being displayed by the mobile device;
   computer program code for determining whether the mobile device is capable of executing multiple real-time data streams simultaneously;
   computer program code for displaying multiple thumbnail image representations, each thumbnail image representation associated with an available real-time data stream, wherein the multiple thumbnail image representations are generated on the mobile device;

computer program code for receiving a selection for a picture-in-picture (PIP) display;

computer program code for receiving a first navigation input from a user interface, the navigation input for navigating among the multiple displayed thumbnail image representations;

computer program code for selecting a primary thumbnail image representation based on the navigation input;

computer program code for receiving a second navigation input from the user interface and selecting a secondary thumbnail image representation based on the second navigation input;

computer program code for activating an audio portion of the real-time data stream associated with the primary thumbnail image representation; and computer program code for displaying the real-time data stream associated with the primary thumbnail image representation and the real-time data stream associated with the second thumbnail image representation in a PIP format on a mobile device display, wherein the thumbnail image representations comprise still images captured from their associated real-time data streams when the mobile device is not capable of executing multiple real-time data streams simultaneously and wherein each thumbnail image representation comprises a real-time data stream when the mobile device is capable of executing multiple real-time data streams simultaneously.

6. The non-transitory computer readable storage medium of claim 5 further comprising computer program code for activating an audio portion of the real-time data stream associated with the secondary thumbnail image representation.

* * * * *